United States Patent [19]

Childers et al.

[11] Patent Number: 5,634,013

[45] Date of Patent: May 27, 1997

[54] BUS BRIDGE ADDRESS TRANSLATOR

[75] Inventors: Brian A. Childers, Santa Clara; Eric A. Baden, Sarotaga, both of Calif.

[73] Assignee: Apple Computer, Inc., Cupertino, Calif.

[21] Appl. No.: 434,183

[22] Filed: May 3, 1995

[51] Int. Cl.$^6$ ................................................ G06F 13/00
[52] U.S. Cl. .......................... 395/280; 395/306; 395/308; 395/309
[58] Field of Search ................................ 395/280, 308, 395/309, 306

[56] References Cited

U.S. PATENT DOCUMENTS

| | | |
|---|---|---|
| 5,257,348 | 10/1993 | Roskowski et al. . |
| 5,263,138 | 11/1993 | Wasserman et al. . |
| 5,274,753 | 12/1993 | Roskowski et al. . |
| 5,301,272 | 4/1994 | Atkins . |
| 5,392,406 | 2/1995 | Petersen et al. ............... 395/325 |
| 5,410,677 | 4/1995 | Roskowski et al. ............ 395/500 |
| 5,448,521 | 9/1995 | Curry et al. ................ 365/189.02 |
| 5,473,762 | 12/1995 | Krein et al. .................... 395/287 |

OTHER PUBLICATIONS

*PowerPC 601 RISC Microprocessor User's Manual*, pp. 2-42 through 2-70; 8-1 through 8-36; and 9-1 through 9-52, published by Motorola in 1993.

*PCI Local Bus Specification*, Review Draft Revision 2.1, published Oct. 21, 1994 by the PCI Special Interest Group, P.O. Box 14070, Portland, OR 97214.

*PCI Multimedia Design Guide*, Revision 1.0 (Mar. 29, 1994), which is distributed by the PCI Multimedia Working Group (part of the PCI Special Interest Group, P.O. Box 14070, Portland, OR 97214).

*Primary Examiner*—Jack B. Harvey
*Assistant Examiner*—John Travis
*Attorney, Agent, or Firm*—Burns, Doane, Swecker & Mathis, L.L.P.

[57] ABSTRACT

A computer bus bridge interconnects first and second buses, the first bus being big-endian and the second bus being little-endian. First address and size signals received from the first bus during a first bus cycle are converted into second address and data unit enable signals for transmission on the second bus during a second bus cycle. The first address comprises a low-order address portion and a remaining upper-order address portion. The data unit enable signals are generated from the low-order address portion and the size signals of the first bus. An address offset is generated from the data unit enable signals. The remaining upper-order address portion of the first address are then concatenated with the address offset and a predetermined lower address portion for use as the second address. The data unit enable signals may designate, say, up to 4 possible data bytes being transferred during a single beat on the second bus. The size signals may designate, say, up to 8 possible contiguous data units being transferred during a single beat on the first bus. Here, byte enable signals are generated by first generating 8 temporary byte enable signals from the low-order address portion and the size signals. Then, 4 of the 8 temporary byte enable signals are selected for use as the byte enable signals on the second bus. The address offset is generated based on presence or absence of assertion of 4 lowest order ones of the 8 temporary byte enable signals.

18 Claims, 4 Drawing Sheets

FIG. 1A

| n | n+1 | n+2 | n+3 | n+4 | n+5 | n+6 | n+7 |
|---|---|---|---|---|---|---|---|
| SCALAR MSB | ••• | ••• | ••• | ••• | ••• | ••• | SCALAR LSB |

BIG-ENDIAN ADDRESS:

FIG. 1B

| n+7 | n+6 | n+5 | n+4 | n+3 | n+2 | n+1 | n |
|---|---|---|---|---|---|---|---|
| SCALAR MSB | ••• | ••• | ••• | ••• | ••• | ••• | SCALAR LSB |

LITTLE-ENDIAN ADDRESS:

| 0 | 1 | 2 | 3 | 4 | 5 | 6 | 7 |
|---|---|---|---|---|---|---|---|
| X | SCALAR MSB | ••• | SCALAR LSB | X | X | X | X |
| 7 | 6 | 5 | 4 | 3 | 2 | 1 | 0 |

BIG-ENDIAN BYTE ORDERING:

LITTLE-ENDIAN BYTE ORDERING:

| 0 | 1 | 2 | 3 | 4 | 5 | 6 | 7 |
|---|---|---|---|---|---|---|---|
| X | X | X | X | SCALAR MSB | ••• | ••• | SCALAR LSB |
| 7 | 6 | 5 | 4 | 3 | 2 | 1 | 0 |

207

BIG-ENDIAN BYTE ORDERING:

LITTLE-ENDIAN BYTE ORDERING:

BUS BRIDGE ADDRESS TRANSLATOR

BACKGROUND

The present invention relates to bridges for interconnecting computer buses of differing types, and more particularly to conversion of an address received on a big-endian bus for use on a little-endian bus.

Computer architectures typically consist of a number of elements, such as one or more processors, memory units, and various input/output (I/O) devices, all coupled together by means of a shared computer bus. In order to facilitate the interconnection of system components that are made by independently operating manufacturers, a number of bus architectures have been standardized. Each bus architecture specifies the necessary electrical and functional characteristics for allowing one device to communicate with others on the same bus.

Bus characteristics can vary widely from one standard architecture to another. For example, some bus architectures include separate address and data lines, while others use shared lines that are time multiplexed between representing address and data information. Regardless of the physical manifestation, however, a typical computer system bus is conceptually divided into an address bus, a data bus and a control bus. A bus transaction is a complete exchange between two bus devices, and typically comprises both an address phase, during which address information is presented on the address bus, and a data phase during which data information is presented on the data bus. The data phase of a bus transaction may follow the address phase of the same transaction in ordered succession, without any other data phase of any other bus transaction intervening. In such a case, the system bus is said to be "tightly ordered." Small computer systems are, as a general rule, tightly ordered. An example of a standardized tightly ordered bus architecture is the PCI local bus. A complete description of the PCI local bus is presented in the *PCI Local Bus Specification*, Review Draft Revision 2.1, published Oct. 21, 1994 by the PCI Special Interest Group, P.O. Box 14070, Portland, Oreg. 97214, which is incorporated herein by reference in its entirety.

By contrast, in some minicomputer and mainframe computers, and more recently in some small computer architectures, buses are "loosely ordered" such that, between the address phase of a bus transaction and the corresponding data phase, other data phases of other bus transactions may occur. The ability of the bus to allow the address bus and data bus to have different masters at the same time is called "split-bus transaction capability". The PowerPC™ computer architecture, co-developed by Apple Computer, utilizes a loosely ordered system bus that provides split-bus transaction capability.

PowerPC™ machines currently sold by Apple are based largely on the Motorola MPC601 RISC microprocessor. The MPC601 permits separate address bus tenures and data bus tenures, where tenure is defined as the period of bus mastership. In other words, rather than considering the system bus as an indivisible resource and arbitrating for access to the entire bus, the address and data buses are considered as separate resources, and arbitration for access to these two buses may be performed independently. A transaction, or complete exchange between two bus devices, is minimally comprised of an address tenure; one or more data tenures may also be involved in the exchange. The address and data tenures of each access request must be arbitrated separately from one another. However, the request for a data bus tenure is not made explicitly, but is instead implied by the occurrence of a corresponding address bus request/transaction. More information about the particulars of the system bus in the MPC601 RISC microprocessor may be found in the *PowerPc 601 RISC Microprocessor User's Manual*, published by Motorola in 1993, which is incorporated herein by reference in its entirety. Another loosely coupled system bus is described in U.S. patent application Ser. No. 08/432,620, which was filed by James Kelly et al. on May 2, 1995, and entitled BUS TRANSACTION REORDERING USING SIDEBAND INFORMATION SIGNALS, and which is incorporated herein by reference in its entirety. The bus that is described in U.S. patent application Ser. No. 08/432,620 is a superset of the conventional PowerPC™ 601 microprocessor interface, and is known as the Apple RISC Bus™, or ARBus™.

Another difference between some bus architectures in general, and between the ARBus™ and the PCI bus in particular, relates to their endian-ness. The concept of endian-ness derives from the fact that computer representations of scalars (individual computational data items) are not indivisible. If they were, then the order of bits or groups of bits within the smallest addressable unit of memory would be irrelevant, because nothing could be observed about such order. However, as implemented in most computer systems, order does matter because scalars can be made up of more than one addressable unit of memory, despite the fact that the processor and programmer regard them as indivisible quantities.

Consider, for example, the PowerPC™ 601 processor, which is capable of handling a 64-bit double word. If the 64-bit double word were the smallest addressable unit, then there would be no question of the order of bytes within double words. All scalar transfers between registers and system memory would be for double words and the address of the byte containing the high-order eight bits of a scalar would be no different from the address of a byte containing any other part of the scalar.

However, in actuality, the smallest addressable memory unit in the PowerPC™ processor is the byte (8 bits), and most scalars are composed of groups of bytes. When a 32-bit scalar is moved from a register to memory, it occupies four consecutive byte addresses, and a decision must be made regarding the order of these bytes in these four addresses.

The choice of byte ordering is arbitrary. Although there are 24 possible permutations of four bytes, only two are practical: big-endian and little-endian. Big-endian ordering assigns the lowest address to the highest-order eight bits of the scalar. The name "big-endian" derives from the fact that the big end of the scalar, considered as a binary number, comes first in memory. By contrast, little-endian byte ordering assigns the lowest address to the lowest-order (rightmost) 8 bits of the scalar. The little end of the scalar, considered as a binary number, comes first in memory.

The difference between big- and little-endian representations is illustrated in FIGS. 1A and 1B. The storage in memory of a scalar comprising eight bytes of data is illustrated in both figures. As shown in FIG. 1A, in a big-endian system the most significant byte (MSB) is stored at address n, the next byte is stored at address location n+1, and so on until the least significant byte (LSB) is stored at address location n+7. By contrast, the little-endian system illustrated in FIG. 1B shows that, for the same scalar, address n refers to the LSB, with increasing addresses referring to more significant bytes, so that the MSB is stored at address location n+7.

The discussion of endian-ness is pertinent to bus architectures, because modern buses are typically wide enough to transfer multiple bytes in a single data transaction, or "beat". Since all data transfers are accompanied by an associated address (typically a byte-address in most microcomputers), it is important, for proper reception of data, to know which byte (i.e., MSB, LSB or other) the address refers to.

Another address-related difference between standardized buses relates their addressing schemes. An addressing scheme would be a trivial matter if each data transfer comprised as many bytes as the bus was capable of handling at one time (i.e., the width of the data bus). In such a case, one would only have to clock in data from the entire bus, and then use the received address and knowledge of the bus' endian characteristic to figure out where the data goes. However, it is often the case that a bus architecture will allow for the transfer of fewer bytes of data than the bus is capable of handling in a single beat. Accordingly, the addressing scheme must also include some method for detecting which byte lanes on the bus contain the transferred data. In the case of the ARBus™, whose dedicated data lines are 64 bits wide, the addressing scheme includes providing a 32-bit wide address, the lower three bits of which designate the byte lane (in big-endian notation) in which the first transferred byte will be found. Three separate control lines, that are also part of the ARBus™, designate the total number of bytes that are being transferred during this data transfer. The three lines are encoded so that the binary value 3'b001 designates one byte of data, the binary value 3'b010 designates two bytes of data, and so on up to 3'b111 which designates seven bytes of data being transferred. In accordance with the ARBus™ design, the value 3'b000 designates eight rather than zero bytes transferred.

By comparison, the PCI bus comprises a little-endian 32-bit wide address-data bus. That is, the address and data information are transferred over a common set of lines during separate bus phases. The transfer of a 64-bit quantity on the PCI bus would first require the communication of a start address (corresponding to the LSB of the first 4-byte quantity to be received), followed by two data beats, each conveying thirty-two bits of data. As a little-endian system, the data transferred during the first beat has a lower address than that of the data received in the second beat. Consequently, a receiving agent on a PCI bus would have to increment the received address by 4 when receiving the second beat of the 64-bit transfer.

To complicate things further, the PCI bus architecture does not require that all thirty-two bits of the bus convey meaningful data during any particular data phase. In order to indicate which byte lanes contain valid data, the PCI bus architecture defines four parallel lines, designated "byte enable signals" (BE[3:0]), which are asserted during the data phase, and which are used for clocking in data only from the indicated byte lanes; data on other byte lanes is ignored. (The BE[3:0] signals are multiplexed with a bus command, which is transmitted during the address phase. A description of the various PCI bus commands is beyond the scope of this discussion.)

In view of the many differences between standardized bus architectures, it is apparent that devices that are designed for one bus type cannot be utilized in a system built around an incompatible bus type without the provision of a mechanism for interconnecting the two buses. Such means for interconnection are known in the art, and are referred to as bus bridges.

When it is desired to interconnect two buses having respectively different methods for indicating addresses of transferred data (e.g., byte address plus size indicators versus word (16-bits) address plus byte enable signals), the bridge must perform a conversion of one type of signal to another. When those two buses have different endian-ness characteristics as well, the task is further complicated by the need to actually transform, say, a big-endian address appearing on one side of the bridge into a valid little-endian address on the other side of the bridge. For example, consider the three-byte scalar 201 depicted in FIG. 2A. When it arrives on an ARBus™ side of the bridge, it will have a hexadecimal address equal to 32'hxxxx xxx1 (or alternatively 32'hxxxx xxx9), where "x" indicates "don't care" values. Furthermore, the corresponding size indicator will be set to 3'b011, to indicate the presence of three meaningful bytes of data on the bus. When the other port of the bridge is connected to a PCI bus, it is the job of the bridge address conversion mechanism to output one data beat with an address equal to 32'hxxxx xxx4 (or alternatively 32'hxxxx xxxC), and the four byte enable signals set to 4'b1000 (assuming that the byte enable signals are active low).

As another example, consider the six-byte scalar 203 depicted in FIG. 2B. When the scalar 203 arrives on an ARBus™ side of the bridge, it will have a hexadecimal address equal to 32'hxxxx xxx2 (or alternatively 32'hxxxx xxxA). Furthermore, the corresponding size indicator will be set to 3'b110, to indicate the presence of six meaningful bytes of data on the bus. When the other port on the bus bridge is connected to a PCI bus, it is the job of the bridge address conversion mechanism to output an address followed by two data beats. In this case, the address will specify 32'hxxxx xxx0 (or alternatively 32'hxxxx xxxC). During the first data beat, the four byte enable signals will be set to 4'b0000 (again assuming signals that are active low), to indicate meaningful data on all four of the byte lanes. During the second data beat, the two MSBs 207 are transferred on the 32-bit wide PCI bus with the four byte enable signals set to 4'b1100 (again, active low signals). Consequently, during the second beat only two bytes will be received by the agent attached to the PCI bus. Notice that no address accompanied the second data beat. It is the responsibility of the receiving agent to know that the data received in the second beat has a base address of 32'hxxxx xxx4 (or alternatively 32'hxxxx xxxC), with possible offsets determined by the byte enable signals.

Finally, it is noted that in some bus bridges, an "address invariance" mode is available, whereby an end-for-end byte swap of the data received on one bus is performed before placing that data on the other bus. The address conversion mechanism must be able to take this into account when deriving converted address and byte enable signals.

SUMMARY

It is therefore an object of the present invention to provide a mechanism in a bus bridge for converting data-designating signals, such as byte address plus size indicators, into a corresponding address plus byte enable signals.

It is another object of the present invention to provide a mechanism in a bus bridge for converting a big-endian address into a corresponding little-endian address.

It is a still further object of the invention for the address-converting mechanism to be responsive to whether or not the bus bridge is operating in an "address invariance" mode, whereby the bridge performs an end-for-end swap of received bytes before passing them on to the target agent.

In accordance with one aspect of the present invention, the foregoing and other objects are achieved in a computer bus bridge for interconnecting first and second buses, the first bus having a first endian characteristic (such as being big-endian) and the second bus having a second endian characteristic (such as little-endian) that is opposite that of the first endian characteristic. The first bus architecture defines address and size signals for designating the location of data units (such as bytes) being transferred. The first address comprises a low-order address portion and a remaining upper-order address portion.

By contrast, the second bus architecture specifies an address and data unit enable signals for designating the location of transferred data units.

An apparatus for converting first address and size signals received from the first bus during a first bus cycle into second address and data unit enable signals for transmission on the second bus during a second bus cycle comprises means for generating the data unit enable signals from the low-order address portion and the size signals of the first bus; and means for concatenating the remaining upper-order address portion of the first address with a predetermined lower-order address portion for use as the second address.

In another aspect of the invention, where the width of the data path on the first bus is greater than the width of the data path on the second bus (e.g., 64-bits versus 32-bits), the apparatus includes means for generating an address offset from the data unit enable signals and means for concatenating the remaining upper-order address portion of the first address, the address offset and a predetermined lower address portion for use as the second address.

In this case, the data unit enable signals designate an integer number from one to n (e.g., four) of possible data units (e.g., bytes) being transferred during a single data transfer beat on the second bus, while the size signals designate an integer number from one to 2n (e.g., 8) of possible contiguous data units being transferred during a single data transfer beat on the first bus. Here, the means for generating the data unit enable signals from the low-order address portion and the size signals of the first bus comprises means for generating a number 2n of temporary data unit enable signals from the low-order address portion and the size signals; and means for selecting n of the 2n temporary data unit enable signals for use as the data unit enable signals on the second bus. Also in accordance with the invention, the means for generating an address offset from the data unit enable signals comprises means for generating the address offset based on presence or absence of assertion of n lowest order ones of the 2n temporary data unit enable signals.

In yet another aspect of the invention, the means for selecting n of the 2n temporary data unit enable signals comprises means for selecting the n lowest order ones of the 2n temporary data unit enable signals whenever at least one of the n lowest order ones of the 2n temporary data unit enable signals are asserted, and for selecting n highest order ones of the 2n temporary data unit enable signals whenever none of the n lowest order ones of the 2n temporary data unit enable signals are asserted.

In the case where data unit enable signals are asserted in both the n lowest and n highest order temporary data unit enable signals, the n lowest order ones of the 2n temporary data unit enable signals are selected during a first data beat on the second bus, and the n highest order ones of the 2n temporary data unit enable signals are subsequently selected during a second data beat on the second bus.

In still another aspect of the invention, the apparatus is useful in an environment in which end-for-end data byte swapping is conditionally performed to maintain address invariance on both sides of the bus bridge. Here, the means for generating the data unit enable signals from the low-order address portion and the size signals of the first bus comprises means for generating a first set of data unit enable signals from the low-order address portion and the size signals of the first bus; and means for generating the data unit enable signals for the second bus by alternatively swapping the first set of data unit enable signals end-for-end or leaving unchanged the first set of data unit enable signals in response to assertion of a control signal. The conditionally swapped data unit enable signals are processed as described above.

BRIEF DESCRIPTION OF THE DRAWINGS

The objects and advantages of the invention will be understood by reading the following detailed description in conjunction with the drawings in which:

FIGS. 1A and 1B are block diagrams illustrating the difference between big- and little-endian addressing schemes for pointing to a scalar;

FIGS. 2A and 2B illustrate problems that occur when converting big-endian addresses into little-endian addresses, and vice versa;

DETAILED DESCRIPTION

Figure 3:
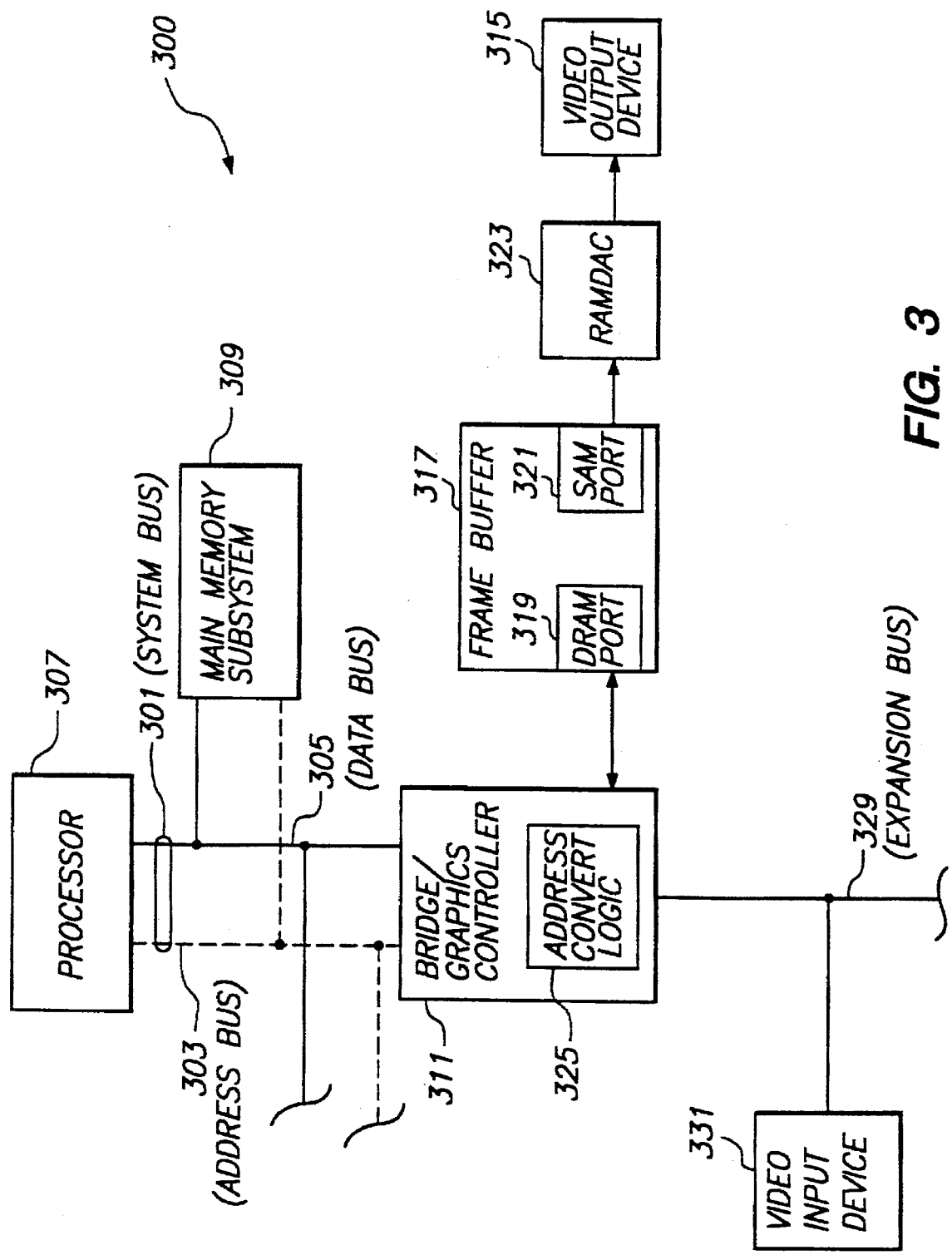
FIG. 3 is a block diagram of a computer system in which the present invention is utilized.

The various features of the invention will now be described with respect to the figures, in which like parts are identified with the same reference characters.

Referring to FIG. 3, the present invention may be used in a computer system 300 of the type shown. It should be understood, however, that the invention is not limited to use only in the illustrated embodiment, but may be used in any mixed-endian environment.

The computer system 300 is based on a system bus 301 that comprises an address bus 303 and a data bus 305. Furthermore, the system bus 301 is preferably of a loosely coupled type that has split-bus transaction capability, such as the ARBus™ described in the BACKGROUND section of this disclosure. Thus, for purposes of this discussion, the data bus may be considered to be 64-bits wide, and the address bus 303 may be considered to be 32-bits wide. Of significance to the present invention is the fact that addressability, as expressed by addresses on the address bus 303, has a granularity of one byte (i.e., the smallest addressable data unit on the bus is one byte, so that incrementing an address by 1 causes one to point to a next byte in sequence). Of further significance to the present invention is the fact that the ARBus™ bus is a big-endian bus.

Attached to the system bus 301 is a processor 307, such as the PowerPC™ 601 microprocessor described above, which is capable of operating in a split-bus transaction environment. For purposes of simplifying the drawing, also attached to the system bus 301 is a block designated as main memory subsystem 309. Those having ordinary skill in the art will appreciate that the main memory subsystem 309 may comprise any combination of static or dynamic random access memory (SRAM or DRAM) as well as read only memory (ROM) and cache memory. For further simplification of the drawing, the main memory subsystem 309 also includes arbitration logic for resolving conflicting access requests made to the address and data buses 303, 305. A more detailed description of these features, which are well-known in the art, is beyond the scope of this disclosure.

In the exemplary system 300, image data is displayed on a video output device 315, which may be, for example, an analog RGB monitor. An image to be displayed is stored in a frame buffer 317 as a set of pixels, the form of which may be in accordance with any of a number of well-known pixel formats, such as RGB and YUV. The frame buffer 317 is a video random access memory (VRAM) which is a special type of dynamic RAM (DRAM) that has a DRAM port 319 (from which pixel data may be randomly accessed) and a serial access mode (SAM) port 321, each for accessing the pixel data stored in the frame buffer 317. The SAM port 321 is connected to a RAMDAC 323, which reads the serial stream of pixel data from the frame buffer 317, and converts the digital bit stream into appropriate analog signals for driving the primary video output device 315.

The exemplary system 300 also includes a video input device 331, which is connected to an expansion bus 329. In a preferred embodiment of the invention, the expansion bus is a PCI bus as described in the BACKGROUND section of this disclosure. The video input device 331 may, for example, supply pixel data that needs to be written to the frame buffer 317 in real time.

A combination bridge/graphics controller 311 is provided, which has one interface for connection to the system bus 301, another interface for connection to the DRAM port 319 of the frame buffer 317, and a third interface for connection to the expansion bus 329. One function of the bridge/graphics controller 311 is to receive frame buffer access requests alternatively from the system bus 301 or from the expansion bus 329 and to provide these to the frame buffer 317 for servicing. This function of the bridge/graphics controller is not pertinent to the present invention, and will not be described here in further detail.

As the focus of the invention is on the bridge function between the system bus 301 and the expansion bus 329, and even more particularly on the writing of data from an initiator agent on the system bus 301 to a target agent on the expansion bus 329, a preferred embodiment of the hardware for routing the flow of data from one point to another within the bridge/graphics controller 311 will now be described with reference to FIG. 4.

Figure 4:
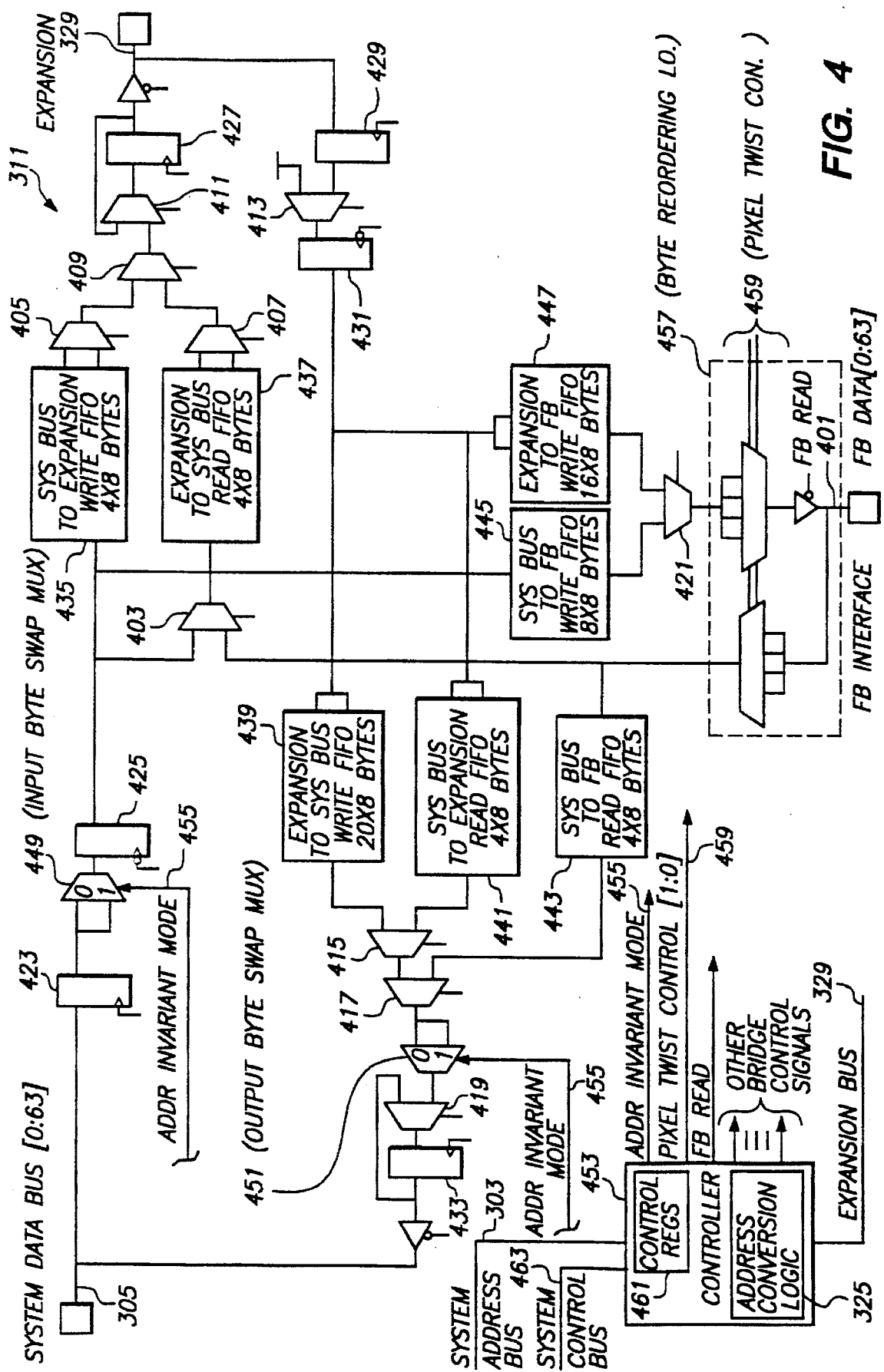
FIG. 4 is a block diagram of the overall data flow within the inventive bridge/graphics controller.

FIG. 4 is a block diagram of the overall data flow within the bridge/graphics controller 311. Three data interfaces are provided for connection to the following: the 64-bit wide system data bus 305, the 32-bit wide expansion bus 329 (which, in a preferred embodiment is multiplexed between address and data information), and the 64-bit wide frame buffer (FB) data bus 401. Various multiplexors 403, 405, 407, 409, 411, 413, 415, 417, 419, 421 and flip-flops 423, 425, 427, 429, 431, 433 are provided, along with a number of first-in-first-out memory units (FIFOs) 435, 437, 439, 441, 443, 445, 447 that are arranged within the data paths as shown, for switching the data from any one source to any of the other destinations, for buffering data between the various sources and destinations, and for converting between the 64-bit and 32-bit interfaces.

Byte reordering logic 457 is provided at the interface to the frame buffer 317, in order to write and read pixel data in a standard format (e.g., big-endian) regardless of the format in which an agent, such as the video input device 331, creates or expects to receive them. The particulars of this logic are not pertinent to the present invention.

The bridge/graphics controller 311 further includes a controller 453 for generating the various control signals that are required for coordinating the operation of all of the resources within the bridge/graphics controller. In a preferred embodiment, the bridge/graphics controller 311 comprises two application specific integrated circuits (ASICs), one comprising all of the data flow hardware, and the other comprising all of the necessary control logic.

For the sake of clarity, most of the control signal connections between the controller 453 and each of the resources within the bridge/graphics controller 311 have been omitted from FIG. 4. However, the interfaces between the controller 453 and the system address bus 307, system control bus 463, expansion bus 329, and frame buffer 317 are generally depicted. Complete descriptions of these interfaces however, which are well-known in the art, are beyond the scope of this description.

Of some pertinence to the present invention is the SysBus-to-ExpansionBus write FIFO 435, which buffers 64-bit wide data that is to be written from the system data bus 305 to the expansion bus 329. The multiplexor 405 allows the 64-bit wide output of the SysBus-to-Expansion write FIFO 435 to be gated onto the expansion bus 329 32-bits at a time.

As previously mentioned, a preferred embodiment of the bridge/graphics controller 311 includes an input byte swap multiplexor 449 and an output byte swap multiplexor 451, each activated for byte-swapping by assertion of the ADDR INVARIANT MODE control signal 455. When activated during data transfers between the system data bus 305 and the expansion bus 329, each of the input and output byte swap multiplexors 449, 451 performs the end-to-end byte swapping that is necessary for maintaining address invariance. Address invariance is a simple rule that says that bytes get mapped across a bridge according to their address (or byte-lane-number); that is, the address of a byte is kept the same on both sides of the bridge by actually performing an end-for-end byte swap of all of the data on the bus. Information about whether the processor is operating in address invariant mode is provided to the controller 453 by the processor 307 during system initialization. The controller stores this information in a corresponding one of its control registers 461.

Figure 5:
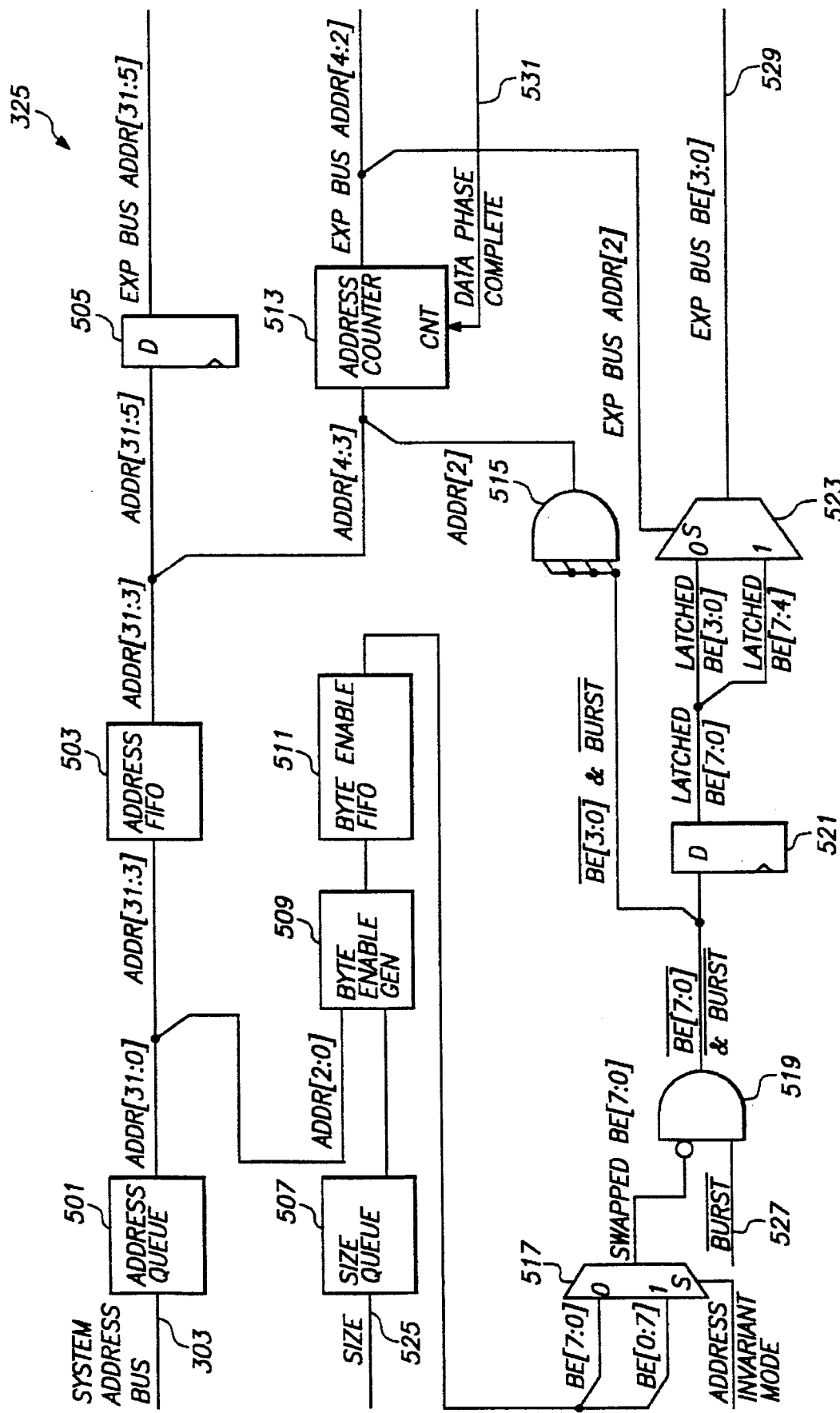
FIGS. 5 is a detailed block diagram of the address conversion logic in accordance with the invention.

The particulars of the address conversion logic 325 will now be described in detail with reference to FIG. 5. Control of the various components included within the address conversion logic 325 is performed by other elements in the controller 453. These other elements have been omitted from FIG. 5 in order to avoid cluttering the figure with unnecessary detail.

The purpose of the address conversion logic 325 is to receive the 32-bit address and size signals from the system bus side of the bridge/graphics controller 311, and to generate therefrom an appropriate set of address and byte enable signals for use on the expansion bus 329. To that end, the address conversion logic 325 includes an address queue 501 for storing 32-bit addresses received from the system address bus 303. At the output of the address queue 501, the most significant twenty-nine bits (designated address bits [31:3] in little-endian order) are coupled to an address FIFO 503. (As used throughout this specification, the distinction between the terms queue and FIFO is intended to represent the respective presence and lack thereof of the ability to remove a stored element without having it pass all the way through the memory unit.) The address queue 501 is preferably two elements deep, and the address FIFO is preferably four elements deep. The purpose of these components is to buffer addresses received from the system address bus 303. The presence of two buffer elements in series is an adaptation associated with the fact that a preferred system bus 301 (i.e., the ARBus™) has split-bus transaction capability as described above. The address queue 501 is used for storing addresses associated with all read operations and addresses associated with those write operations whose data phases (also called "tenures") have not yet occurred. By contrast, the address FIFO 503 is used exclusively for storing addresses associated with write operations for which at least one data tenure has occurred. In this respect, the address FIFO 503 is somewhat in correspondence with the SysBus-to-Expansion write FIFO 435 (FIG. 4), since this latter component receives the data that was transferred during the at least one data tenure. Thus, when a read address works its way to the head of the address queue 501, it will stay there until the address FIFO 503 is empty (i.e., until it contains no write addresses), at which point the value of the read address at the output of the 501 passes through to the output of the address FIFO 503 without being clocked into the address FIFO 503.

It should be observed that the present invention is not limited for use only with system buses 301 having split-bus transaction capability. Consequently, for tightly ordered system buses the address queue 501 and the address FIFO 503 could be combined into a single buffering device. In such a case, it is preferable to continue to provide the ability to remove elements from the buffering device in the event that the access request cannot be completed.

In correspondence with the address queue 501 and the address FIFO 503, the address conversion logic 325 further includes a size queue 507 (preferably two elements deep) and a byte enable FIFO 511 (preferably four elements deep), arranged in sequence. Interposed between these two components is a byte enable generator 509 having two inputs: one for receiving the low order three bits (i.e., bits [2:0]) from the output of the address queue 501, and another input for receiving the output from the size queue 507. This arrangement works as follows.

The size queue 507 is coupled to receive the three-bit size indicator 525. As discussed in the BACKGROUND section of this disclosure, the size indicator is encoded to designate how many meaningful contiguous bytes are being transferred on the system data bus 305, where 3'b001 indicates one byte, 3'b111 indicates seven bytes, and 3'b000 indicates eight bytes. Reads to the size queue 507 are made in correspondence with reads to the address queue, so that when an address makes its way to the head of the address queue 501, its associated size indicator will be sitting at the head of the size queue 507.

The output of the size queue 507 is supplied to an input of the byte enable generator 509. The byte enable generator 509 uses this information in conjunction with the low-order three address bits from the address queue 501 to generate a set of eight byte enable signals. At this point in the logic, each byte enable signal that is set to a binary "1" corresponds to a byte lane on the system data bus 305 that contains meaningful data. The byte enable generator 509 preferably comprises combinatorial logic that first generates a correct sequence of left-justified byte enable signals, and then shifts these signals right until the left-most signal is in the bit position indicated (in accordance with big-endian ordering) by the three least significant address bits received from the address queue 501. Thus, the byte enable generator 509 may be represented by the following VERILOG™ statements (VERILOG™ is a register transfer language that is well-known in the art for use in designing digital logic):

```
assign   PBE =   Size[2:0] == 3'b001 ? 8'h80:
                 Size[2:0] == 3'b010 ? 8'hC0:
                 Size[2:0] == 3'b011 ? 8'hE0 :
                 Size[2:0] == 3'b100 ? 8'hF0 :
                 Size[2:0] == 3'b101 ? 8'hF8 :
                 Size[2:0] == 3'b110 ? 8'hFC :
                 Size[2:0] == 3'b111 ? 8'hFE : 8'hFF;
assign   ByteEnGenOut[7:0] = PBE[0:7] >> AddrQOut[2:0];
```

Those familiar with the PCI bus will recognize that it is a requirement that byte enable signals be negatively asserted. The transformation of the byte enable signals from positive to negative assertion signals is performed later within the address conversion logic 325.

The 8-bit wide output of the byte enable generator 509 is supplied to the byte enable FIFO 511, which clocks them in whenever the address FIFO 503 loads a value from the address queue 501. Also, the byte enable FIFO 511 is read whenever the address FIFO 503 is read. This serves to make the byte enable signals available at the output of the byte enable FIFO 511 when the corresponding write address makes its way to the head of the address FIFO 503.

The output of the byte enable FIFO 511 is supplied to two inputs of a bit-swapping multiplexor 517. At a first ("0") input of the bit-swapping multiplexor 517, the bits are connected in the same sequence as that in which they are supplied by the byte enable FIFO 511, so that when the first input is selected, the byte enable signals simply pass through to the output of the bit-swapping multiplexor 517. At a second ("1") input of the bit-swapping multiplexor 517, the bits from the byte enable FIFO 511 are supplied in reverse order, so that when the second input is selected, the eight byte enable signals appear swapped end-for-end at the output of the bit-swapping multiplexor 517. Selection of either the first or second multiplexor input is controlled by the ADDR INVARIANT MODE signal 455. This arrangement provides for the order of the byte enable signals to be reversed whenever the input byte swap multiplexor 449 (see FIG. 4) performs an end-for-end byte swap of the eight bytes of data received from the system data bus 305. These actions occur whenever the bridge/graphics controller 325 is initialized to operate in address invariant mode. In this way, the conditionally swapped byte enable signals always indicate, by the presence of binary 1's, where the meaningful data is located on the system data bus 305.

As previously mentioned, in the preferred embodiment the byte enable signals are required to be negatively asserted signals (i.e., active low) when supplied for use as byte enable signals on the expansion bus. Accordingly, the conditionally swapped byte enable signals are supplied to an inverting input of a logical AND gate 519. The other input of the AND gate 519 receives a eight "copies" of the negatively asserted BURST* signal 527, which indicates when a burst write operation is being performed. In a preferred embodiment of the invention, the system bus 301 transfers data in either single- or four-beat burst transfers. Single-beat operations can transfer from one to eight bytes at a time and can be misaligned. Burst operations always transfer eight words (=8 times 32 bits) and are aligned to four- or eight-word address boundaries. The assertion (active low) of the BURST* signal 527 therefore causes all eight bits at the output of the AND gate 519 to be binary 0's, which would correctly signal to the expansion bus 329 the presence of meaningful data in all eight byte lanes. If the BURST* signal 527 is not asserted (=binary 1's), then this allows the inverted swapped byte enable signals to pass through to the output of the AND gate 519.

The output of the AND gate 519 is supplied to a latch 521, which clocks all eight inverted byte enable signals ("BE* [7:0]") under the direction of the controller 453. At the output of the latch 521, the latched byte enable signals are divided into two groups: a first group comprising the least significant four signals ("latched BE[3:0]") and a second group comprising the most significant four signals ("latched BE[7:4]"). The first group of latched byte enable signals are supplied to a first ("0") input of a byte enable multiplexor 523, and the second group of latched byte enable signals are supplied to a second ("1") input of the byte enable multiplexor 523. The byte enable multiplexor 523 is controlled as follows:

1) If meaningful data is present only on one or more of the low order four bytes of the 64-bit system data bus 305 (as viewed after any possible end-for-end byte swapping), then the first input of the byte enable multiplexor 523 is selected for output to the expansion bus byte enable lines 529 during the one and only data beat on this bus.

2) If meaningful data is present only on one or more of the high order four bytes of the 64-bit system data bus 305 (as viewed after any possible end-for-end byte swapping), then the second input of the byte enable multiplexor 523 is selected for output to the expansion bus byte enable lines 529 during the one and only data beat on this bus.

3) If meaningful data is present on both the high and low order four bytes of the 64-bit system data bus 305 (as viewed after any possible end-for-end byte swapping), then the first input of the byte enable multiplexor 523 is selected for output to the expansion bus byte enable lines 529 during a first data beat on the bus, followed by selection of the second input of the byte enable multiplexor 523 during a subsequent (second) data beat on the bus.

The signal for controlling alternative selection of the first or second inputs of the byte enable multiplexor 523 is bit number "2" (using little-endian notation) of the address that is actually placed onto the expansion bus 329. Thus, in case 1) above (in which only data from the low four bytes of the eight byte system data bus 305 will be transferred), the expansion bus address bit "2" will be a 1'b0, thereby selecting the low order latched byte enable signals. Considering case 2) above (in which only data from the high four bytes of the eight byte system data bus 305 will be transferred), the expansion bus address bit "2" will be a 1'b1, thereby selecting the high order latched byte enable signals. Finally, in case 3) above (in which data will be transferred from both halves of the system data bus 305), the expansion bus address bit "2" must start out as a 1'b0, in order to initially select the low order latched byte enable signals. A mechanism is provided for changing the value of the expansion bus address bit "2" to a 1'b1 for use during the second data beat on the expansion bus 329. This mechanism, as well as generation of the remaining address bits for transport on the expansion bus 329 will now be described in detail.

As explained above, the need to convert one address into another derives from the fact that, in the exemplary embodiment of the invention, big-endian addresses are supplied to the bridge/graphics controller 311 by the system address bus 303, whereas the expansion bus 329 expects to see little-endian addresses.

Furthermore, the width of the system data bus 305 is eight bytes wide. Thus, the low order three bits from the system address bus 303 designate the byte lane in which the most significant byte of the transferred scalar will appear. By contrast, the expansion bus 329 does not utilize the three low order address bits to determine where meaningful data begins. Instead, it relies only on address bit "2" (the most significant of the three lowest order address bits) to designate a word offset, and then utilizes the expansion bus byte enable signals 529 to indicate the byte lanes in which the meaningful data exists.

Thus, in the exemplary system, the most significant twenty-nine bits of the thirty-two bit addresses are the same in both big- and little-endian formats. Because of this, the twenty-nine bit address appearing at the output of the address FIFO 503 may be directly transferred to the expansion bus 329 without conversion. In a preferred embodiment, the most significant twenty-seven of these are simply supplied to an address latch 505 whose output may be coupled to the expansion bus 329 during address phases of that bus.

The lowest two bits at the output of the address FIFO 503 (address bits [4:3]) are coupled to be received as the most significant two bits of a three-bit address counter 513. These bits two bits will simply be provided to the expansion bus 329 as expansion bus address bits [4:2] during an address phase of the expansion bus 329.

It remains to determine the value of address bit "2" that is to be placed onto the expansion bus 329. It is unnecessary to determine values for address bits of lower significance because this information is conveyed by the expansion bus byte enable signals 529. The purpose of address bit "2" is to indicate the word offset (in little-endian format) of the byte (or bytes) to be transferred during a first data phase on the expansion bus 329. This bit is generated by a four input AND gate 515 whose four 1-bit inputs are connected to corresponding ones of the low order four inverted byte enable signals supplied by the AND gate 519. Because these signals are active low, a value of 4'hF indicates the absence of meaningful data in the low order four byte lanes on the 64-bit wide system data bus 305. Thus, only one data phase will be performed on the expansion bus 329, and the expansion bus address bit "2" should be set to 1'b1, to indicate a one word (=4 bytes) offset. The output of the AND gate 515 generates this bit. Note that if the low order four inverted byte enable signals represent a hexadecimal value other than 4'hF, then meaningful data is present in the low-order four byte lanes on the (possibly byte-swapped) system data bus 305, and the expansion bus address bit "2" should be set to 1'b0, to indicate a zero word offset. The AND gate 515 produces this result as well.

The output of the AND gate 515 is therefore supplied for use as the lowest order bit to the address counter 513. The 3-bit output of the address counter 513 is supplied as expansion bus address bits [4:2] during the address phase of the expansion bus cycle. In this way, the concatenation of the twenty-seven bits from the output of the address latch 505 with the three bits from the output of the address counter 513 serve as the most-significant thirty bits of the 32-bit expansion bus address. As to the low order two bits of the 32-bit expansion bus address, it is observed that in a preferred embodiment of the invention (e.g., where the expansion bus 329 is a PCI local bus), accesses in memory address space are decoded to a four-byte address using only the upper thirty bits of the thirty-two bit address. It is up to the information conveyed in the expansion bus byte enable signals 529 to indicate finer-resolution little-endian offsets to the start of the data within the four-byte data unit. Nonetheless, all targets are required to check the low order two bits of the expansion bus address during a memory command transaction in order to determine the requested burst order (e.g., linear incrementing or cacheline wrap burst mode). Accordingly, this information is preferably encoded into a two bit quantity by the controller 453, and supplied as the two least-significant address bits on the expansion bus 329.

Further in accordance with the invention, the address counter 513 has a "COUNT" input coupled to receive a DATA PHASE COMPLETE signal 531. This causes the output of the address counter 513 to be incremented by "1" at the conclusion of each data phase. In accordance with the expansion bus protocol (see, e.g., the *PCI local bus Specification*) this incremented address is not transmitted on the expansion bus 329. However, the incremented address bit "2" is supplied to the "select" input of the byte enable multiplexor 523, so that in the case of multiple data phase transfers, selection of the first and second inputs of the byte enable multiplexor 523 will toggle back and forth with each subsequent data phase.

It is further noted that by dimensioning the address counter 513 as a 3-bit counter instead of just 1-bit (which would still be capable of generating the signal to be supplied to the "select" input of the byte enable multiplexor 523) an interrupted burst access can later be resumed with the correct address being reflected by the output of the address counter 513.

The above description of the invention sets forth the various features necessary for conversion of an address from the big-endian system bus 301 for use on the little-endian expansion bus 329. It will be recognized that certain aspects of the invention would be modified, without departing from the spirit of the invention, for adaptation to mixed-bus environments having different characteristics from those described in the exemplary embodiment. For example, the illustrations and description presented above are premised on the width of the system data bus 305 being twice as wide as that of the expansion bus 329 (i.e., 64-bits versus 32-bits). Because of this, data transfers from the system bus 301 to the expansion bus 329 required splitting up the data into two halves, and alternatively sending only one of these halves (in the case of meaningful data residing only in one of the bus halves) or else sending the two halves in sequential data phases. The possibility of sending only one of the two data halves is the reason for the need to generate the expansion bus address bit "2" as described above: this bit designates an offset for the case where only the upper half of data is to be communicated.

However, the invention can be adapted for use in environments where the ratio of system data bus width-to-expansion data bus width is something greater than two-to-one. For example, if the system data bus 305 were 128-bits wide compared to the expansion bus' width of 32-bits (i.e., a ratio of four-to-one), the need would exist to generate a two-bit offset field that would be transmitted as expansion bus address bits [3:2].

Similarly, it may be the case that the width of the system data bus 305 is equal to the width of the expansion bus 329. For example, if both data buses are 64-bits wide (which is an optional implementation of the PCI local bus), it is unnecessary to generate any offset bit. Instead, the upper twenty-nine bits of the address received from the system address bus 303 would be passed unchanged directly to the expansion bus 329, along with eight (rather than four) expansion bus byte enable signals generated in accordance with the principles set forth above.

The invention can also be adapted for use in environments having an expansion bus width that is greater than that of the system data bus width. For example, assume a system data bus width of 16-bits, compared to the expansion bus width of 32-bits. In this case, the inventive address conversion logic would use the incoming size and low-order address information to generate the four expansion bus byte enable signals 529 as described above. The upper 29-bits of the address from the system bus would simply be passed, without the need for generation of an offset.

The invention has been described with reference to a particular embodiment. However, it will be readily apparent to those skilled in the art that it is possible to embody the invention in specific forms other than those of the preferred embodiment described above. This may be done without departing from the spirit of the invention.

For example, the invention may be used with bus architectures other than those indicated in the exemplary embodiment. The system data bus 305 and expansion bus 329 need not be 64-bits and 32-bits wide, respectively, and the smallest addressable data unit (i.e., granularity of addressability) for the buses need not be a byte as described in the exemplary embodiment. Also, it need not be the case that the system bus 301 is big-endian and the expansion bus 329 is little-endian; the invention can easily be adapted for use in a system in which the reverse is true (i.e., the system bus 301 is little-endian and the expansion bus 329 is big-endian).

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a computer bus bridge for interconnecting first and second buses, the first bus having a first endian characteristic and the second bus having a second endian characteristic that is opposite that of the first endian characteristic, an apparatus for converting first address and size signals received from the first bus during a first bus cycle into second address and data unit enable signals for transmission on the second bus during a second bus cycle, wherein each data unit enable signal is for alternatively designating presence or absence of a meaningful data unit, and wherein the first address comprises a low-order address portion and a remaining upper-order address portion, the apparatus comprising:

means for generating the data unit enable signals from the low-order address portion and the size signals of the first bus; and means for concatenating the remaining upper-order address portion of the first address with a predetermined lower-order address portion for use as the second address.

2. The apparatus of claim 1, wherein the means for generating the data unit enable signals from the low-order address portion and the size signals of the first bus comprises:

means for generating a first set of data unit enable signals from the low-order address portion and the size signals of the first bus; and means for generating the data unit enable signals for the second bus by alternatively swapping the first set of data unit enable signals end-for-end or leaving unchanged the first set of data unit enable signals in response to assertion of a control signal.

3. The apparatus of claim 1, wherein the first endian characteristic is a big-endian characteristic, and the second endian characteristic is a little-endian characteristic.

4. The apparatus of claim 1, wherein each data unit enable signal is for alternatively designating presence or absence of a meaningful byte of data.

5. In a computer bus bridge for interconnecting first and second buses, the first bus having a first endian characteristic and the second bus having a second endian characteristic that is opposite that of the first endian characteristic, an apparatus for converting first address and size signals received from the first bus during a first bus cycle into second address and data unit enable signals for transmission on the second bus during a second bus cycle, wherein each data unit enable signal is for alternatively designating presence or absence of a meaningful data unit, and wherein the first address comprises a low-order address portion and a remaining upper-order address portion, the apparatus comprising:

> means for generating the data unit enable signals from the low-order address portion and the size signals of the first bus;
>
> means for generating an address offset from the data unit enable signals; and
>
> means for concatenating the remaining upper-order address portion of the first address, the address offset and a predetermined lower address portion for use as the second address.

6. The apparatus of claim 5, wherein the means for generating the data unit enable signals from the low-order address portion and the size signals of the first bus comprises:

> means for generating a first set of data unit enable signals from the low-order address portion and the size signals of the first bus; and
>
> means for generating the data unit enable signals for the second bus by alternatively swapping the first set of data unit enable signals end-for-end or leaving unchanged the first set of data unit enable signals in response to assertion of a control signal.

7. The apparatus of claim 5, wherein:

> the data unit enable signals designate an integer number from one to n of possible data units being transferred during a single data transfer beat on the second bus;
>
> the size signals designate an integer number from one to 2n of possible contiguous data units being transferred during a single data transfer beat on the first bus;
>
> the means for generating the data unit enable signals from the low-order address portion and the size signals of the first bus comprises:
>
> > means for generating a number 2n of temporary data unit enable signals from the low-order address portion and the size signals; and
> >
> > means for selecting n of the 2n temporary data unit enable signals for use as the data unit enable signals on the second bus; and
>
> the means for generating an address offset from the data unit enable signals comprises means for generating the address offset based on presence or absence of assertion of n lowest order ones of the 2n temporary data unit enable signals.

8. The apparatus of claim 7, wherein the means for selecting n of the 2n temporary data unit enable signals comprises means for selecting the n lowest order ones of the 2n temporary data unit enable signals whenever at least one of the n lowest order ones of the 2n temporary data unit enable signals are asserted, and for selecting n highest order ones of the 2n temporary data unit enable signals whenever none of the n lowest order ones of the 2n temporary data unit enable signals are asserted.

9. The apparatus of claim 8, wherein the means for selecting n of the 2n temporary data unit enable signals comprises means, responsive to concurrent assertion of at least one of the n lowest order ones of the 2n temporary data unit enable signals and assertion of at least one of the n highest order ones of the 2n temporary data unit enable signals for selecting, during a first data beat on the second bus, the n lowest order ones of the 2n temporary data unit enable signals, and for subsequently selecting, during a second data beat on the second bus, the n highest order ones of the 2n temporary data unit enable signals.

10. In a computer bus bridge for interconnecting first and second buses, the first bus having a first endian characteristic and the second bus having a second endian characteristic that is opposite that of the first endian characteristic, a method of converting first address and size signals received from the first bus during a first bus cycle into second address and data unit enable signals for transmission on the second bus during a second bus cycle, wherein each data unit enable signal is for alternatively designating presence or absence of a meaningful data unit, and wherein the first address comprises a low-order address portion and a remaining upper-order address portion, the method comprising the steps of:

> generating the data unit enable signals from the low-order address portion and the size signals of the first bus; and
>
> concatenating the remaining upper-order address portion of the first address with a predetermined lower-order address portion for use as the second address.

11. The method of claim 10, wherein the step of generating the data unit enable signals from the low-order address portion and the size signals of the first bus comprises the steps of:

> generating a first set of data unit enable signals from the low-order address portion and the size signals of the first bus; and
>
> generating the data unit enable signals for the second bus by alternatively swapping the first set of data unit enable signals end-for-end or leaving unchanged the first set of data unit enable signals in response to assertion of a control signal.

12. The method of claim 10, wherein the first endian characteristic is a big-endian characteristic, and the second endian characteristic is a little-endian characteristic.

13. The method of claim 10, wherein each data unit enable signal is for alternatively designating presence or absence of a meaningful byte of data.

14. In a computer bus bridge for interconnecting first and second buses, the first bus having a first endian characteristic and the second bus having a second endian characteristic that is opposite that of the first endian characteristic, a method of converting first address and size signals received from the first bus during a first bus cycle into second address and data unit enable signals for transmission on the second bus during a second bus cycle, wherein each data unit enable signal is for alternatively designating presence or absence of a meaningful data unit, and wherein the first address comprises a low-order address portion and a remaining upper-order address portion, the method comprising the steps of:

> generating the data unit enable signals from the low-order address portion and the size signals of the first bus;
>
> generating an address offset from the data unit enable signals; and
>
> concatenating the remaining upper-order address portion of the first address, the address offset and a predetermined lower address portion for use as the second address.

15. The method of claim 14, wherein the step generating the data unit enable signals from the low-order address portion and the size signals of the first bus comprises the steps of:

generating a first set of data unit enable signals from the low-order address portion and the size signals of the first bus; and generating the data unit enable signals for the second bus by alternatively swapping the first set of data unit enable signals end-for-end or leaving unchanged the first set of data unit enable signals in response to assertion of a control signal.

16. The method of claim 14, wherein:

the data unit enable signals designate an integer number from one to n of possible data units being transferred during a single data transfer beat on the second bus;

the size signals designate an integer number from one to 2n of possible contiguous data units being transferred during a single data transfer beat on the first bus;

the step of generating the data unit enable signals from the low-order address portion and the size signals of the first bus comprises the steps of:

generating a number 2n of temporary data unit enable signals from the low-order address portion and the size signals; and selecting n of the 2n temporary data unit enable signals for use as the data unit enable signals on the second bus; and the step of generating an address offset from the data unit enable signals comprises generating the address offset based on presence or absence of assertion of n lowest order ones of the 2n temporary data unit enable signals.

17. The method of claim 16, wherein the step of selecting n of the 2n temporary data unit enable signals comprises selecting the n lowest order ones of the 2n temporary data unit enable signals whenever at least one of the n lowest order ones of the 2n temporary data unit enable signals are asserted and selecting n highest order ones of the 2n temporary data unit enable signals whenever none of the n lowest order ones of the 2n temporary data unit enable signals are asserted.

18. The method of claim 17, wherein the step of selecting n of the 2n temporary data unit enable signals comprises the steps of:

detecting concurrent assertion of at least one of the n lowest order ones of the 2n temporary data unit enable signals and assertion of at least one of the n highest order ones of the 2n temporary data unit enable signals; and in response to the detecting step, selecting during a first data beat on the second bus, the n lowest order ones of the 2n temporary data unit enable signals, and then subsequently selecting, during a second data beat on the second bus, the n highest order ones of the 2n temporary data unit enable signals.

* * * * *